United States Patent
Meyer et al.

(10) Patent No.: US 9,302,422 B2
(45) Date of Patent: Apr. 5, 2016

(54) DEVICE AND METHOD FOR LAMINATING A SUBSTRATE LAYER WITH A DECORATIVE LAYER

(75) Inventors: Andreas Meyer, Hatzenbühl (DE); Marco Ganz, Durmersheim (DE); Dirk Hasse, Unterschleiβheim (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 432 days.

(21) Appl. No.: 12/918,148

(22) PCT Filed: Feb. 19, 2009

(86) PCT No.: PCT/EP2009/001207
§ 371 (c)(1),
(2), (4) Date: May 5, 2011

(87) PCT Pub. No.: WO2009/103541
PCT Pub. Date: Aug. 27, 2009

(65) Prior Publication Data
US 2011/0198021 A1    Aug. 18, 2011

(30) Foreign Application Priority Data

Feb. 19, 2008 (DE) .......................... 10 2008 009 762

(51) Int. Cl.
*B29C 65/00* (2006.01)
*B32B 37/00* (2006.01)
(Continued)

(52) U.S. Cl.
CPC .............. *B29C 51/165* (2013.01); *B29C 51/08* (2013.01); *B29C 51/46* (2013.01); *B29C 2791/006* (2013.01); *B29C 2791/007* (2013.01); *Y10T 156/1028* (2015.01)

(58) Field of Classification Search
CPC ........ B29C 53/00; B29C 53/02; B29C 53/04; B29C 53/06; B29C 53/16; B29C 53/18; B29C 53/36; B29C 55/00; B29C 55/20; B29C 63/00; B29C 63/0073; B29C 63/0026; B29C 63/0034; B29C 63/0091; B29C 63/0095; B29C 63/02; B29C 63/025; B29C 63/04; B29C 63/044; B29C 63/046; B29C 63/06; B29C 63/065; B29C 63/22; B29C 63/26; B29C 63/30; B29C 65/00; B29C 65/02; B29C 65/48; B29C 66/00145; B32B 37/10; B32B 37/1018; B32B 37/1027; B32B 37/1036; B32B 37/1054; B32B 37/12; B32B 37/16; B32B 37/18; B32B 37/20; B32B 37/22
USPC ............ 18/285, 477.1, 212, 475, 581, 583.91
See application file for complete search history.

(56) References Cited

U.S. PATENT DOCUMENTS 5,076,880 A * 12/1991 Spengler et al. ............... 156/382
5,111,039 A * 5/1992 Froning ..................... 250/231.1
(Continued)

FOREIGN PATENT DOCUMENTS

DE    3109338 A1    9/1982
DE    4008221 A1    9/1990
(Continued)

OTHER PUBLICATIONS

International Search Report for corresponding PCT Application No. PCT/EP2009/001207, dated May 14, 2009.
(Continued)

*Primary Examiner* — Michael N Orlando
*Assistant Examiner* — Matthew Hoover
(74) *Attorney, Agent, or Firm* — Reising Ethington P.C.

(57) ABSTRACT

A method for laminating a substrate component to a thermally deformable decorative layer in a tool in which, for laminating, the decorative layer is held so as to be pre-tensioned in a holding device or in the tool and is placed on a substrate layer that rests on the tool, where prior to placing the decorative layer on the substrate component the second side of a molding contour piece that can be moved relative to the decorative layer is made to contact the pre-heated decorative layer, and by way of a further relative movement of the decorative layer relative to the holding device deforms the decorative layer in one section.

28 Claims, 4 Drawing Sheets

(51) Int. Cl.
  *B29C 51/16* (2006.01)
  *B29C 51/08* (2006.01)
  *B29C 51/46* (2006.01)

(56) References Cited

U.S. PATENT DOCUMENTS

| | | | | |
|---|---|---|---|---|
| 5,324,384 | A | * | 6/1994 | Spengler ................ 156/581 |
| 5,711,845 | A | * | 1/1998 | Ozawa et al. ........... 156/477.1 |
| 6,752,887 | B2 | * | 6/2004 | Runge et al. ............. 156/64 |
| 2006/0151087 | A1 | * | 7/2006 | Mizuta .................... 156/64 |
| 2006/0284348 | A1 | | 12/2006 | Matich |
| 2007/0246865 | A1 | * | 10/2007 | Oakey et al. ............ 264/409 |
| 2009/0294041 | A1 | | 12/2009 | Schellhase |

FOREIGN PATENT DOCUMENTS

| | | |
|---|---|---|
| DE | 9408396 U1 | 9/1994 |
| DE | 19733126 A1 | 2/1999 |
| DE | 102004063658 B4 | 4/2007 |
| EP | 0384270 A2 | 8/1990 |
| EP | 0734841 A2 | 10/1996 |
| EP | 1491311 A1 | 12/2004 |
| WO | 2004113053 A1 | 12/2004 |
| WO | 2007128589 A | 11/2007 |

OTHER PUBLICATIONS

International Preliminary Report on Patentability and Written Opinion for corresponding PCT Application No. PCT/EP2009/001207, Sep. 7, 2010.

\* cited by examiner

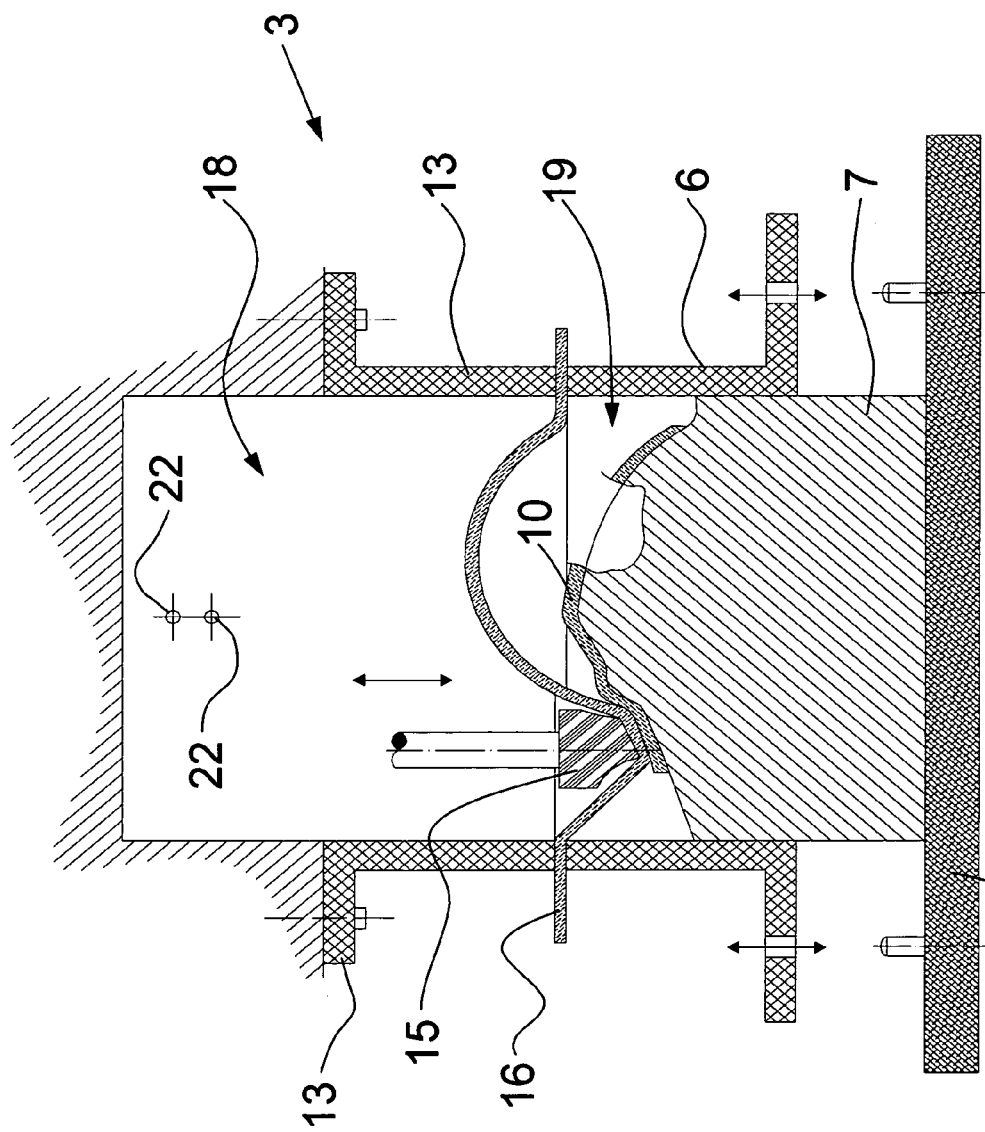

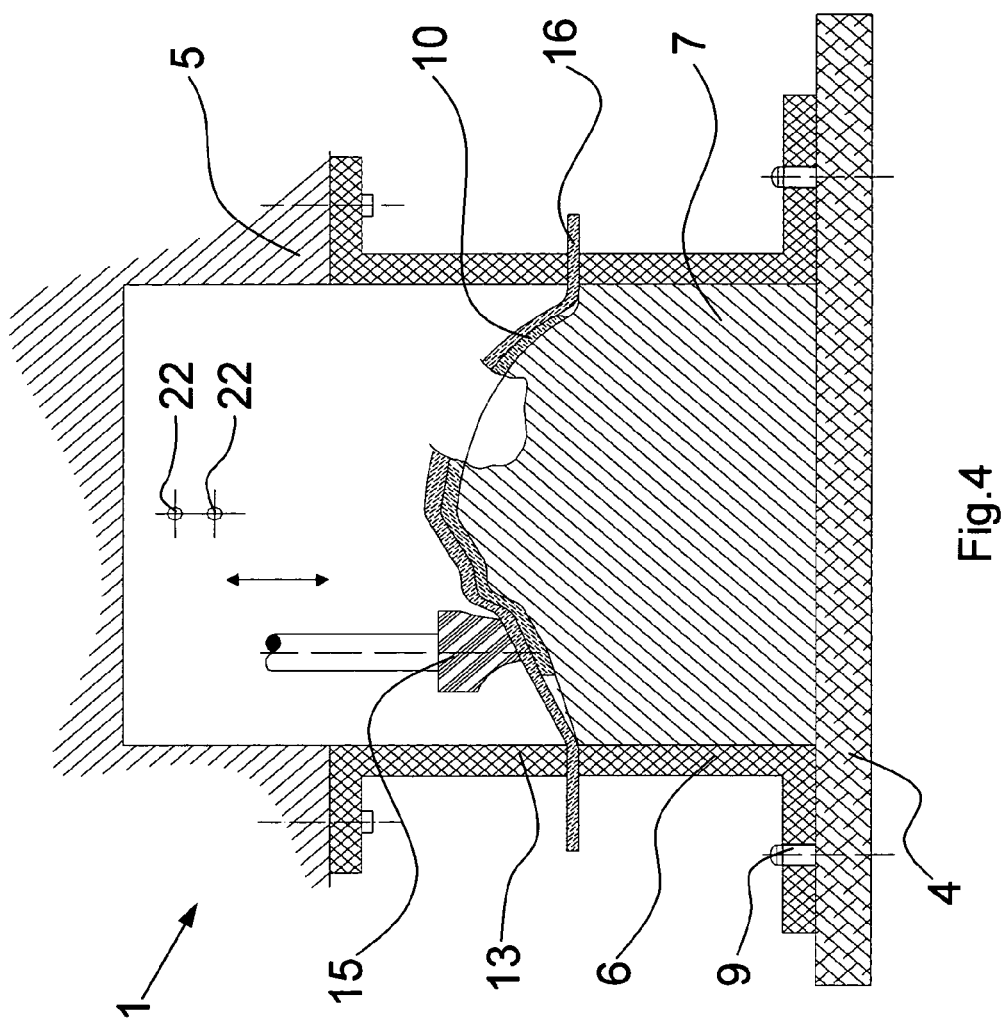

DEVICE AND METHOD FOR LAMINATING A SUBSTRATE LAYER WITH A DECORATIVE LAYER

BACKGROUND

The invention relates to a tool and a method for laminating a decorative layer onto a substrate component.

A laminating tool is known from DE 31 09 338.

US 2007/0246865 describes a method and apparatus for forming a sheet of polymeric material.

DE 10 2004 063 658 B4 shows a vacuum laminating tool with two tool components for manufacturing a decorative layer, wherein each tool component comprises a forming contour that determines the contour of the decorative layer in order to effect forming of the decorative layer as a result of moving the tool components together. From EP 1 491 311 A1 a laminating device for laminating a substrate forming component with a covering material is known, which laminating device comprises a lower tool and an upper tool. The upper tool comprises an elastic pressing-on means designed as a membrane in order to distribute the laminating pressure also in steep flank regions and in edge regions of the substrate forming component in a more homogeneous manner.

From DE 197 33 126 A1 a method and a device for thermally forming plastic film or foil is known, wherein during forming, in order to maintain a predetermined temperature distribution, the film or foil is heated.

DE 94 08 396 U1 describes a device for HF-laminating trim parts with vacuum support, in which device prior to closing the tool halves a decorative blank is clamped between a centring ring and a pressure ring.

From EP 0 734 841 A2 a method for bonding a decorative layer to a substrate layer is known, in which method the decorative layer is first pre-extended by means of a contour piece, and the contact region by means of which the decorative layer rests against the contour piece is pressed into a concave forming section of the substrate layer. As a result of pressing the contour piece against the decorative layer, and as a result of pressing-in the said contact region of said decorative layer, sliding movements between the decorative layer and the contact side of the contour piece result. Consequently the quality of the decorative layer on its visible side is negatively affected. Furthermore, the extension process and the pressing-in process during pressing the contour piece onto the decorative layer also results in impairment of the visible side of the decorative layer and, furthermore, in a reduction in the thickness of said decorative layer, which is associated with a disadvantage in the context of precise processing of the decorative layer.

From DE 40 08 221 A1 a method for connecting a substrate layer to a decorative layer by means of a thermal compression-moulding method is known. Pressing the decorative layer onto the substrate layer results in compression in particular of the decorative layer, as a result of which compression the quality of the decorative layer on its visible side is impaired.

SUMMARY OF THE INVENTION

It is the object of the invention to create a laminating device and a laminating method by means of which device or method the application of a decorative layer onto a substrate layer with complex shapes can be achieved while maintaining the quality, in particular of the visible side, of the decorative layer.

This object is met by one or more embodiments disclosed or described herein. Further embodiments are also disclosed or described herein.

The invention provides for: a laminating tool for the manufacture of a component comprising at least one substrate component and at least one film-like or foil-like decorative layer with a first side that faces the substrate layer, and a second side that is situated opposite the first side, with the laminating tool comprising:

a first tool component with a supporting surface for placing substrate the component, a holding device for holding the decorative layer which for insertion of the decorative layer in a two-dimensionally extending state can be moved from a region outside the laminating tool to a holding position in which a decorative layer accommodated by the aforesaid is held above the first tool component, an upper tool frame which is positioned above the first tool component, and a lower tool frame which from a first position, in which the aforesaid is situated below the holding position of the holding device, is positioned to a second position in which the aforesaid is situated on the upper tool frame, in order to in this position together with the upper tool frame hold the decorative layer to an edge region, a moulding contour piece that can be moved by means of an adjustment device, comprising a moulding contact surface, wherein the adjustment device is designed in such a manner that in a first position the moulding contact surface of the moulding contour piece is situated above the holding device in its holding position, and in a second position the moulding contact surface of the moulding contour piece is situated below the holding device in its holding position, wherein the contour piece in its second position can press the decorative layer onto a region of the substrate component that rests on the supporting surface.

The two-dimensionally extending state of the decorative layer can, in particular in a starting step, be a state in which the decorative layer is held so as to be taut. As a result of heating the decorative layer either previously or in such a taut state, the decorative layer can be brought to a more or less sagging state in which the decorative layer, when viewed in the two-dimensional cross section, forms a curved line as a result of its intrinsic weight.

According to the invention, a laminating tool is thus provided for manufacturing a component comprising at least one substrate layer or one substrate component and at least one, in particular thermally deformable, decorative layer, with the laminating tool comprising: a first or lower tool component with a moulding contour surface for placing the substrate layer or the substrate component, and a holding device for holding the decorative layer with a first side that faces the substrate layer, and a second side that is situated opposite the first side. In the device according to the invention or in the method according to the invention it is provided for the substrate component to be placed as an injection moulded part onto a supporting surface of the lower tool component. In this arrangement a fastening device or tensioning device can be allocated to the lower tool component, by means of which fastening device or tensioning device the substrate component can be affixed to the tool component. The laminating tool comprises a moulding contour piece that can be moved by means of an adjustment device, wherein the adjustment device is designed in such a manner that the moulding contour piece can press the decorative layer on its second side, prior to the aforesaid being placed onto the substrate layer, in the state held by the holding device. The moulding contour piece can be moved relative to the first tool component and can be brought in proximity with and/or in contact with the moulding contour surface or supporting surface of the first tool component or of a decorative layer resting thereon.

The laminating tool according to the invention thus comprises a tool component comprising a contour-providing forming surface for accommodating or for placing the substrate layer or the substrate component. According to the invention, at least one deformable decorative layer is placed on the aforesaid, wherein a predetermined region, which is to be placed onto the substrate layer, of the first side of the decorative layer is placed as completely as possible onto the substrate layer. It can be provided for the decorative layer, for the purpose of forming, to be heated to a predetermined temperature in order to obtain an elasticity of the decorative layer, which elasticity is required for laminating as intended. In this arrangement the decorative layer can either be placed or fed into the laminating tool in an already heated up state, or it can be heated only in the laminating mould to a temperature that makes possible reliable processing of the decorative layer. Thus, heating the decorative layer can take place before, during or after placement or forming. The laminating tool according to the invention furthermore comprises a moulding contour piece that can be moved relative to the tool component, which contour piece can be driven against the second side of the decorative layer. The moulding contour piece can thus be moved relative to the holding device, in particular if the aforesaid holds the decorative layer during the laminating process, in such a manner that the moulding contour piece can press by its second side the decorative layer, prior to placing the aforesaid onto the substrate layer, in the state held by the holding device. In this arrangement the section of the decorative layer that in this process rests against the contour piece can be fixed in such manner that a section located between this section of the decorative layer and a section of the decorative layer by means of which said decorative layer is held by the holding device extends freely over the substrate layer, and can be placed or pulled onto the substrate layer either manually or by machine.

In particular, the laminating tool can be designed in such a manner that the contour piece and/or the tool component, onto which during the laminating process the substrate layer is placed, can be moved relative to each other in such a manner that the contour piece can be made to contact the moulding contour surface of the tool component or of the visible side of a decorative layer resting on a substrate component that rests on the tool component. This driving the moulding contour piece against this section of the decorative layer and against the decorative layer resting against the tool component causes the region of the decorative layer to be pressed against a corresponding section of the substrate layer. In this way by means of the contour piece the mutually pressed-together sections of the decorative layer and of the substrate layer can be fixed or clamped relative to each other on the tool component. The above-mentioned section, which freely extends between this section of the decorative layer and the section of the decorative layer by which the aforesaid is held by the holding device, which section extends over the substrate layer, can consequently be placed or pulled onto the substrate layer either manually or by means of a machine.

According to the method according to the invention for laminating a substrate layer to a decorative layer, the following steps are provided:

placing the rear of a substrate component, designed as an injection moulded part, against the supporting surface of a first tool component, wherein on the laminating side, which is situated opposite the rear, of the substrate component, a laminating binding agent for bonding the substrate component to the decorative layer has been applied, holding the decorative layer by means of a holding device in a holding position in which a decorative layer accommodated by the aforesaid is held above the first tool component so that the visible side of the decorative layer faces away from the side on which the substrate component is situated, moving together an upper tool frame from a position above the first tool component and a lower tool frame from a first position in which said tool frame is situated below the decorative layer held by the holding device in such a manner that the aforesaid hold the decorative layer within the holding positions of the holding device; and releasing the holding device from the decorative layer, pressurising a section of the decorative layer, which section is situated between the moulding contour piece and a holding section of the holding device, by means of pressurising the air surrounding the aforesaid such that the section of the decorative layer curves away from the substrate component, moving a moulding contour piece with a moulding contact surface from a position above the decorative layer in the direction towards the substrate component so that the moulding contact surface comes to rest against a section of the held decorative layer and pushes this section against a contact section of the substrate component, reducing pressurisation of the air surrounding the decorative layer so that the curved section is placed onto the section of the substrate component situated below the aforesaid and is bonded to the aforesaid by means of the laminating binding agent.

Pressurisation can take place by producing negative pressure on the side of the decorative layer (16) that faces away from the substrate component, or by blowing against that side of the decorative layer that faces the substrate component.

The substrate component can, in particular, be an injection moulded part comprising ABS.

The preheated decorative layer is thus held above the tool component in a holding device, for example in a tensioning device or a tensioning frame. The holding device can hold the decorative layer both prior to and/or during movement of the tensioning frame, which movement is caused by a tensioning-frame adjustment device, in the direction of the tool component, and/or prior to and/or during a movement of the tool component, which movement is caused by a tool component-adjustment device, in the direction of the holding device. As a result of at least one of the described movements the moulding contour piece, by means of a contour-piece adjustment device, can be brought from the second side to the held decorative layer, can drive against said decorative layer, and in this process can deform the decorative layer at least in the section of the moulding contour piece driving against said decorative layer. In this method the moulding contour piece can be guided in a linear manner, wherein the moulding contour piece can be guided to drive perpendicularly to the section of the second side of the decorative layer. Instead of movement perpendicularly to the decorative layer, the moulding contour piece can impinge on the decorative layer also at an angle, for example at an angle of between 80° and 90°, thus deforming said decorative layer in one section.

The adjustment devices can be driven adjustment devices, wherein for example an electric motor, a hydraulic or pneumatic drive or an elastic body, for example a spring, can be used as a drive device.

In order to check that, for example, the tensioning frame prior to closing the tool is in the correct position to properly place the decorative layer on the substrate layer, reaching the correct position of the tensioning frame can be detected by suitable means. To this effect the tool component can, for example, comprise a light barrier that detects when the tensioning frame with the clamped decorative layer has reached a predetermined desired position. Instead of a light barrier, detection can also take place by induction, mechanical switches or monitoring by means of a camera by comparing a stored desired position image with the actual position image, wherein in each case when the desired position has been reached movement of the frame is stopped, and the frame can be fixed in this position by suitable means.

After the tensioning device with the decorative layer clamped therein has reached its intended position for laminating the substrate component, and the detection device has communicated the reaching of the position, for example to a machine control system, either only the moulding contour piece or the moulding contour piece together with the tensioning frame can be moved by the respective adjustment device in the direction towards the tool component. In the latter case the moulding contour piece can be moved more quickly in the direction of the tool component so that it can run against the decorative layer held in the tensioning device before said decorative layer comes to rest against the substrate layer. Likewise, both the forming contour piece and the tool component can be moved by the respective adjustment devices towards the fixed tensioning device, wherein, as above, the forming contour piece can run against the second side of the decorative layer before the first side of the decorative layer comes to rest against the substrate layer.

This can be achieved either in that the tensioning device can be moved in the direction of the moulding contour piece until said contour piece can deform the second side of the decorative layer by a predetermined extent in the direction towards the tool component, and can be affixed in this position. Subsequently the tool component can move from the first side of the decorative layer to the decorative layer and can deform said decorative layer so that the decorative layer can be tensioned over the substrate layer resting on the tool component and as the tool component continues can come to rest against the substrate layer.

The described respective movements of the moulding contour piece, the tool component and/or the tensioning device can take place simultaneously or in succession, wherein the latter can result in longer production times while at the same time, however, being able to reduce the danger of faulty products.

Before or after the moulding contour piece runs against the decorative layer held in the tensioning device, hot or warm compressed air can blow against said decorative layer, by means of a blowing device using compressed air, from the direction of the first side in order to counteract premature cooling of the moulding contour piece so that the decorative layer curves in the direction away from the tool component. Curving can also be achieved in that in proximity to, or a short distance above, the second side of the decorative layer a suction device, for example a suction duct or a suction pipe, ends, by means of which the decorative layer is aspirated without, however, touching the suction device. As a result of this curvature, any folds present in the decorative layer can be smoothed, or fold formation during laminating can be prevented. The curvature can be maintained at least until the moulding contour piece deposits the decorative layer on the substrate layer and presses it against said substrate layer. In other words, the curvature resulting from the compressed air or from the suction air can still be maintained until shortly prior to the conclusion of the laminating process.

In order to monitor the maximum stretching of the bubble, which is necessary to prevent excessive stretching of the decorative layer, which excessive stretching can in an extreme case cause a rupture, the tool can comprise at least one sensor device, for example a light barrier, that can regulate the blow air or the suction air depending on the size of the formed bubble. The sensor device thus acquires the vertical position of a section of the decorative layer and thus the distance of the section from the section situated below it of the first tool component, or of a substrate component resting against said tool component. In other words, for example if excessive bubble formation is detected, the quantity of the supplied blow air or suction air can be reduced. Apart from the formation of too big a bubble, the formation of too small a bubble can also be undesirable because in the case of too small a bubble any folds that may be present in the decorative layer cannot be fully smoothed out. In this case it can be advantageous to provide at least two sensor devices on the tool in order to detect both too small a bubble and too big a bubble. Instead of a light barrier it is also possible to use non-contacting distance meters, touch switches or other known and suitable sensor devices or detection devices.

Monitoring the size of the bubble formed by the decorative layer as a result of compressed air or suction air can also help in the detection of faults in the decorative layer that have occurred in the production process. For example, with a known quantity of air being blown per unit of time, a material thickness of the decorative layer, which material thickness is below the permitted product tolerances, can lead to the formation of too big a bubble; while a material thickness above the tolerance range can form too small a bubble with a known air supply.

If the decorative layer is heated only by blowing in hot compressed air, then by means of the size of the bubble it can be determined that the decorative layer has been heated to an adequate extent and has attained the desired elasticity. In other words, the size of the bubble can indicate that the decorative layer has attained the correct temperature for further processing. If the decorative layer is placed into the tool in an already pre-heated state, then the size of the bubble can also indicate whether the decorative layer has achieved the correct temperature and thus the desired elasticity.

When the moulding contour piece in one section has driven against the decorative layer, then the moulding contour piece and the tensioning device and/or the tool component can be moved onwards until the moulding contour piece presses the decorative layer in the section onto the substrate layer. As a result of the curvature it is possible for the decorative layer to be pressed against the substrate layer only in the section that is formed by the moulding contour piece or by a supporting surface of the moulding contour piece, while the rest of the decorative layer need not yet have established contact with the substrate layer. If the supply of compressed air is continuously, incrementally or suddenly reduced, and if at the same time the tensioning frame continues to be lowered over the tool component, or if the tool component continues to be moved into the tensioning frame, the decorative layer that is not formed by the moulding contour piece can be mounted on the substrate layer; in other words it can be pulled onto the substrate layer.

As a result of the ability to hold the decorative layer at this point in time already in the section of the moulding contour piece, when pulling the decorative layer onto the substrate layer, tension forces can then only occur between the holding section of the moulding contour piece and the edge of the tensioning device. In the region in which the moulding contour piece presses the decorative layer against the substrate layer the decorative layer can then no longer be displaced relative to the substrate layer. Consequently the degree of drawing out the decorative layer can be reduced in all regions. Structures or grain arrangements on the first side of the decorative layer can consequently be drawn out to a lesser extent than is the case in known laminating processes. The contact pressure of the decorative layer acting on the substrate layer can be further increased without any effect on the degree of drawing out, for example in that the substrate layer can be connected to a vacuum source by way of small holes or material-associated pores that can be activated when the tensioning frame has reached its end position relative to the tool component.

The moulding contour piece can drive against the decorative layer in a freely selectable region and can deform said decorative layer in that region, even in a region that on the finished component can be situated in a mounted region, in other words invisible to the user.

Movement of the moulding contour piece can be caused by means of a drive, for example by means of an electric motor, continuously in the direction of the decorative layer; however, the moulding contour piece can also be pre-tensioned by an elastic force, for example a spring, in the direction of the tool component.

With the use of an electric motor the speed of lowering can be regulated so that the moulding contour piece at the beginning of its movement can have a speed that differs from, for example is greater than, the speed at the time of driving against the decorative layer and at deformation of the decorative layer.

Movement of the moulding contour piece by means of a drive can, for example, be used if the moulding contour piece and the tensioning frame, for the purpose of laminating, drive against the non-moving tool component. In this case the moulding contour piece can first move on its own until it has deformed the decorative layer in the section along a predetermined length in the direction of the tool component. Subsequently, the moulding contour piece and the tensioning device can together move further towards the tool component until the contour piece that moulds the decorative layer can press the decorative layer in the section at a predeterminable force against the substrate layer that rests against the tool component. The moulding contour piece can then be in its final position in the laminating process, in which final position it can be held and/or affixed for the further laminating process. In contrast to this the tensioning device can move further in the direction of movement, as a result of which the decorative layer is tensioned over the tool component or the substrate layer resting thereon.

Pre-tensioning the moulding contour piece in the direction of the tool component can, for example, be used either if the tensioning device is not moved during laminating, or if the tensioning device is moved only in the direction of the moulding contour piece until the aforesaid has driven against the second side of the decorative layer, and during further movement in the direction towards the tool component has deformed the decorative layer to a defined extent. In this arrangement deformation of the decorative layer by the moulding contour piece is to be completed before the tool component drives against the first side of the decorative layer.

Movement of the moulding contour piece can be continued until the moulding contour piece touches the tool component or a section of the contour of the tool component. In order to define a maximum desired pressure at which the moulding contour piece can press the decorative layer onto a substrate layer placed on the tool component, the movement of the moulding contour piece can also be limited to approaching the tool component. This means that when the final position of the moulding contour part has been reached a space that forms a gap between the moulding contour part and the tool component or the contour of the tool component can exist. The gap size, in other words the clearance between the moulding contour part and the tool component, can then correspond to the thickness of the substrate layer plus the thickness of the decorative layer, which thickness the two components comprise when they are compressed at a predetermined pressure. The space to be observed by the moulding contour piece and the tool component during the laminating process can also be pre-settable, for example in order to be able to be correspondingly set in the case of a change in the thickness of the substrate layer and/or of the decorative layer. Setting the gap size of the moulding can also be effected automatically, for example by measuring the actual pressure on the moulding contour part by means of a pressure measuring device. The determined actual pressure can then be transmitted to a control device or regulating device of the tool or of the machine, where it can be compared with a stored desired pressure. Based on the measured pressure differential it is then possible to adjust the pressure of the moulding contour piece by controlling the adjustment device.

During movement towards the tensioning device the tool component or the substrate layer resting on the aforesaid can first make contact with the decorative layer in the section of the moulding contour piece. During further movement of the tool component the pressure of the moulding contour piece on the tool component can increase up to a predetermined desired pressure at which the moulding contour piece is to press the decorative layer onto the substrate layer during the laminating process. If after this desired pressure has been attained the tool continues to move against the first side of the decorative layer, then the moulding contour piece can be taken along, against the pre-tensioning force that corresponds to the force required to generate the desired pressure, by the tool component to a laminating end position. As described above, onward movement of the tool component to the laminating end position can cause the decorative layer held in the tensioning device to be tensioned over the substrate layer.

The protective scope of the invention also covers combinations of the movement sequences, described above, of the contour part, the tensioning device and the tool component. For example, the moulding contour piece can first be driven in order to drive against the first side of the decorative layer held on a stationary tensioning device, and can deform or pre-form said decorative layer in the section by the predetermined extent in the direction of the tool component. Subsequently the tool component can drive against the first side of the decorative layer. If in this process the desired pressure described above is attained, the moulding contour piece can drive along, either driven so as to be synchronous with the tool component, or it can be taken along by the tool component against a corresponding restoring force.

At its end on the side of the decorative layer, the moulding contour piece can comprise a shape that at least in some sections corresponds to the contour of the tool component in the region where the moulding contour piece presses the decorative layer onto the substrate layer. In this sense the moulding contour piece can form a die-stamp with a counter-contour that matches the contour of the tool component in this section.

The moulding contour piece can also be used to additionally impress in the decorative layer, for example, an item number, manufacturer markings, the date of manufacture, the batch number and/or other information.

The moulding contour piece can also be designed so as to be ring shaped, for example if the moulding contour piece is to hold the decorative layer on the substrate layer in a region in which the substrate layer comprises an opening or a cutting. It is then not intended for the moulding contour piece to press the decorative layer through the opening directly onto the tool component. Therefore in this region the moulding contour piece can be shaped in such a manner that it rests only against the edges of the substrate layer, which edges are formed by the substrate layer, while in the region of the opening said contour piece does not exert any pressure on the decorative layer.

The decorative layer can be a plastic film or foil, which when heated to a predetermined temperature is sufficiently flexible to be able to follow even complicated contours. As a result of this the plastic film or foil can be applied to the substrate layer that rests on the tool component with a complex surface shape without any folds or blisters. In this arrangement heating the decorative layer can take place before the decorative layer in the holding frame is fed to the tool component, and/or during feeding and/or on completion of the feed-in movement.

The decorative layer can comprise a smooth decorative surface, but it can also comprise a surface that comprises a structure, for example a surface comprising an aesthetically pleasing grain arrangement, which surface then after laminating characterises the visual and haptic impression of the surface of a laminated substrate component. By means of the device according to the invention and the method according to the invention, laminating is achieved by means of which the surface structure, and in particular the grain arrangement of the decorative layer, by means of which the decorative layer is moved to a position above the first tool component, is not changed. Consequently, in particular, elaborately produced surface structures and grain arrangements of the decorative layer on the visible side of said decorative layer can be preserved in the laminating process while a particularly economical laminating method is carried out. The decorative layer can be of a single layer or a multilayer design, for example comprising a closed surface and at least one soft, foam-like, open-pored backing formed underneath said surface. This soft backing can be applied to the closed surface, for example vulcanised, welded or bonded on. For reasons associated with the ability to recycle the decorative layer, and in order to prevent any outgassing of solvents of the adhesive, the closed and the soft layers of the decorative layer can comprise an identical material, for example a plastic by means of which both layers can be manufactured in one process. Any future problems associated with subsequent disposal can further be prevented if the substrate layer also comprises an identical or very similar plastic. The laminated substrate components can then be disposed of in one piece without there being any further separation expenditure. In this way it is possible to save disposal expenditure and raw materials expenditure in the manufacturing process, for example by admixing recycled material in the manufacture of new components.

Applying the decorative layer onto the substrate layer can also take place with the use of a tool comprising a lower tool with a contour and an upper tool with a countercontour and a moulding contour part according to the invention, which contour part is associated with the upper tool and/or the lower tool, wherein the decorative layer is laminated by the upper tool onto the substrate layer resting in the lower tool. In this arrangement the upper tool can comprise a smooth surface or a surface with a structure, for example a grain arrangement, which it permanently impresses during the laminating process into the surface of the decorative material. However, the tool can also comprise a lower tool with a contour and an upper tool without a contour, for example a box, which matches the circumference of the lower tool, which upper tool together with the lower tool can form a hermetically sealed tool.

When moving the tool components together the decorative layer can be clamped between the upper tool and the lower tool so that the lower tool and the upper tool form two spaces separated by the decorative layer. In this arrangement the decorative layer can separate the lower tool from the upper tool as far as the air is concerned; in other words the decorative layer can comprise an airtight or at least as far as possible airtight material so that any air exchange between the two tool components is at least rendered difficult. If the decorative layer is held in a clamping manner between the moved-together tool components, the tensioning device can release the decorative layer and can, for example, be fitted with the next decorative layer for the next laminating process.

Air, for example heated compressed air, can be blown between the lower tool, or the substrate layer resting on the lower tool, and the decorative layer held in the tensioning frame or between the upper and lower tool components, so that the decorative layer can curve away from the substrate layer into the upper tool, and any folds in the decorative layer can be smoothed out. The moulding contour piece can then drive against this bubble or partial bubble formed from the decorative layer, and in this manner can already deform the decorative layer in this region prior to the actual laminating process. The moulding contour piece can also drive against the decorative layer, seated in the tensioning frame, from the direction of the first side and can deform the aforesaid before compressed air is blown underneath the decorative layer. In this arrangement, in the latter case, blowing air underneath the decorative layer can commence before the moulding contour piece presses the decorative layer firmly onto the substrate layer, or only after the moulding contour piece presses the decorative layer firmly onto the substrate layer.

The curvature can also be achieved in that the space formed by the second side of the decorative layer and the upper tool is connected to a suction line or to a vacuum, as a result of which the decorative layer can curve in the direction of the negative pressure, in other words away from the contour of the lower tool.

In order to finish laminating, with the tool completely closed, the air forming the bubble can then be removed by suction through the bottom tool, or the air in the bubble can be connected to a vacuum by way of the bottom tool so that the first side of the decorative layer firmly presses against the substrate layer and can be laminated onto said substrate layer. The suction force of the vacuum acting on the decorative layer can be supported by increasing the pressure on the second side of the decorative layer, which side faces away from the substrate layer.

Reaching the position for feeding in the compressed air and for switching the vacuum on can be monitored by suitable, well-known, means, and can trigger the individual steps of laminating by way of the machine control system.

For laminating, the decorative layer can be pressed onto the substrate layer by suction force, by a described combination comprising suction force and pressure force of vacuum and positive pressure, or by an upper tool that comprises a countercontour to the contour of the lower tool and in each one of the cases additionally with the moulding contour piece. In other words, during laminating always at least one section of the moulding contour piece presses the decorative layer directly onto the substrate layer, irrespective of the design of the upper tool.

Consequently, during laminating, the decorative layer is firmly held in this section, and the decorative layer cannot be further stretched or extended. Consequently, the degree of drawing out the decorative layer in this region can be reduced; there is no danger of the decorative layer in this region, which can be a critical region of the contour, for example tearing. At the same time, as a result of the reduced degree of drawing out, the structure or grain arrangement formed on the upper side of the decorative layer can be stretched to a lesser extent; in other words the structure or grain arrangement can maintain its original shape better than is the case in known methods.

The invention also relates to the method for laminating a substrate component with a thermally deformable decorative layer in a tool, in which method for laminating the decorative layer is held so as to be pre-tensioned in a holding device or in the tool, and is placed onto a substrate layer resting on the tool, wherein prior to placing the decorative layer on the substrate layer a moulding contour piece, which can be moved relative to the decorative layer, is made to contact the second side of the pre-heated decorative layer, and as a result of a further relative movement of the decorative layer relative to the holding device deforms the decorative layer in one section.

In other words, the invention can also relate to the method for manufacturing a laminated plastic part comprising a substrate layer and a thermally deformable decorative layer in a laminating tool according to the invention with a tool and the contour piece according to the invention. In this arrangement the decorative layer, which is held in a holding device and is pre-heated to laminating temperature, is placed in the holding device at a predetermined distance from the tool component and is held.

The moulding contour piece is moved to the second side of the decorative layer and is pressed into the pre-tensioned decorative layer in the direction of the tool component. The moulding contour piece comprises a contact surface that can correspond to a section of a contour of the tool component. After the moulding contour piece has been pressed into the decorative layer pre-tensioned in the tensioning frame, for example compressed air can blow against the decorative layer so that the latter curves in the direction away from the tool component. Now the moulding contour piece can move further in the direction of the tool component or of the substrate layer resting thereon, until in one section the contact surface of the moulding contour piece presses the decorative layer at a predetermined force onto the substrate layer. In this way the decorative layer can be affixed to the substrate layer so that during the further laminating process the decorative layer, at least in this section, can no longer be displaced relative to the substrate layer. In the next step the pressure of the compressed air can be reduced; the curvature can be reduced until the decorative layer rests with its entire surface against the substrate layer. Subsequently the moulding contour piece can be moved back, the tensioning frame can be opened, and the laminated component can be removed for further processing.

In order to additionally hold the decorative layer on the substrate layer, the substrate layer can, for example, comprise small holes that are connected to a vacuum source by way of the tool component, which vacuum source can be opened as soon as the decorative layer rests against the substrate layer.

The method according to the invention can comprise all the movement sequences, described in the context of the device, of the contour part, the holding device and the tool component. As an alternative to blowing with compressed air, the curvature of the decorative layer can also be generated by blowing with a gas or by suction force. The tool for implementing the method can be a one-part or a two-part tool.

BRIEF DESCRIPTION OF THE DRAWINGS

Below, exemplary embodiments of the invention are described with reference to the enclosed figures, which show the following:

FIG. 3 illustrates the tool, which to a large extend is closed, in which the moulding contour piece according to the invention presses the decoration material in the section onto the substrate layer and finishes forming said decoration material; and FIG. 4 illustrates the closed tool with the decoration material laminated onto the substrate layer, which decoration material is held in the section by the moulding contour piece according to the invention.

DETAILED DESCRIPTION OF THE PREFERRED EMBODIMENTS

Figure 1:
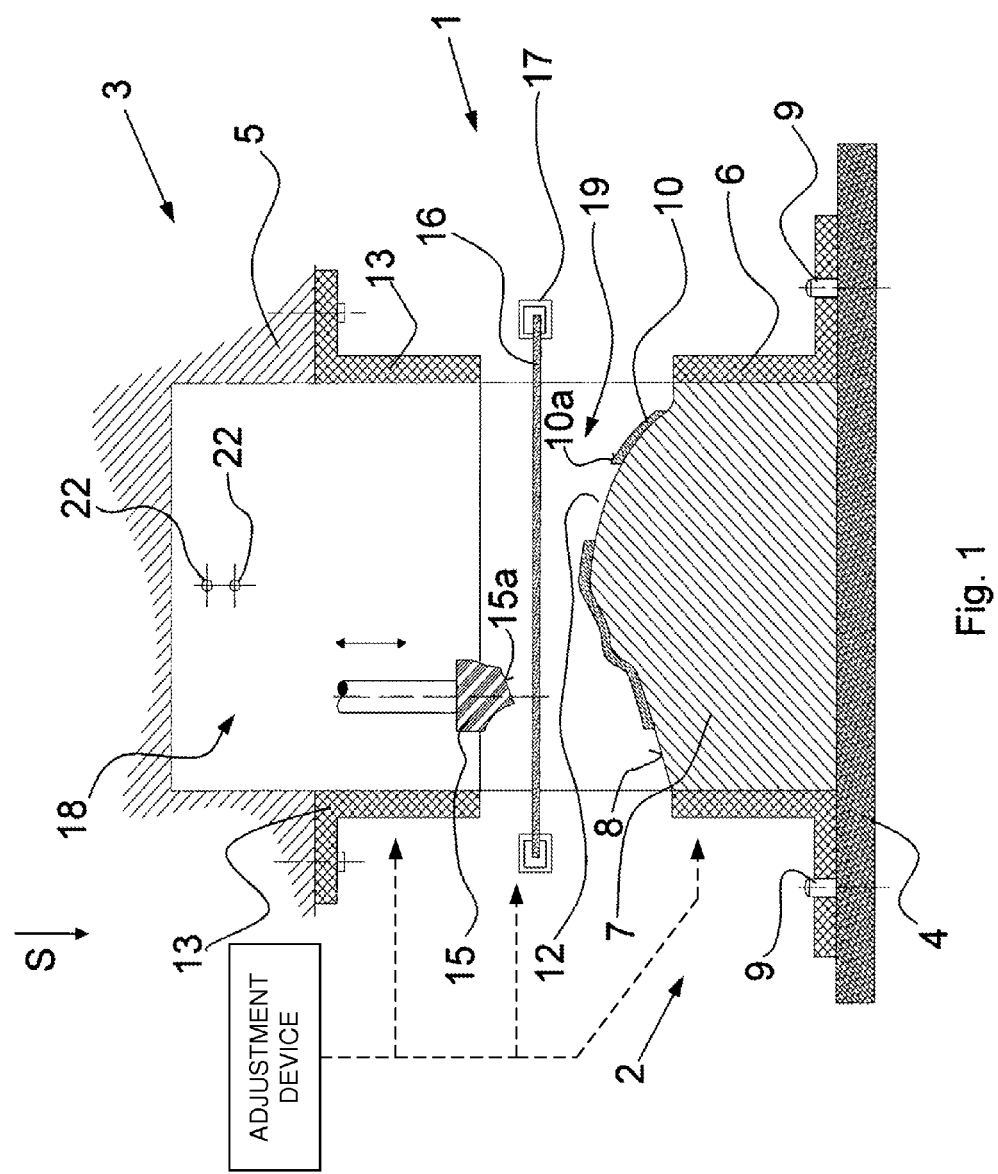
FIG. 1 illustrates an open laminating tool with a decoration material in a tensioning frame and with a moulding contour piece according to the invention.

The laminating tool 1 used according to the invention is provided for manufacturing a component comprising at least one substrate component 10 and at least one film-like or foil-like decorative layer 16. In this arrangement in an initial state the rear of the substrate component rests against a supporting surface of a first tool component or lower tool component 2 so that the laminating side 10a, to which in the method the decorative layer is to be applied, faces upwards.

The substrate layer used for the device according to the invention and for the method according to the invention is, in particular, a substrate component manufactured on the basis of an injection moulding process. In this arrangement it can, in particular, be provided that in a first step, which follows the injection moulding step, the substrate component rests in its dimensionally stable or cooled state against the first tool component 2. In this arrangement, for example, polypropylene PP, a mixture comprising PP and EPDM (PP/EPDM T20), ABS (acrylonitrile-butadiene-styrene-copolymer plastic), ABS-PC (ABS with polycarbonate fractions) or PA (polyamide) and generally thermoplastic materials can be considered for use as plastic materials. Furthermore, a natural fibre material with reinforcement components such as plastic material or wood fibre material, or a metal, can be used as a material for the substrate component.

Furthermore, a laminating binding agent or laminating adhesive is applied to the laminating side of the substrate component 10. Applying the laminating adhesive can take place before the substrate component 10 is placed on the first tool component 2, or after the substrate component 10 has been placed on the first tool component 2. The laminating binding agent can, in particular, be
 a dispersion adhesive,
 a solvent or
 a hot-melt adhesive
or it can comprise one or several of these means.

The decorative layer 16 can comprise one layer or several layers and is preferably bonded to the substrate component.

The decorative layer can, in particular, be provided to provide haptic characteristics of the final product or of the interior fitting component on the outside of the aforesaid, which characteristics correspond to the predetermined requirements.

In one exemplary embodiment the decorative layer comprises two layers. In the design of the decorative layer comprising two or more than two layers, the decorative layer can comprise a cover layer and a foam layer, which when viewed from the visible side is situated underneath said cover layer. In one exemplary embodiment the cover layer comprises PVC or TPO or a combination of these materials, and the foam layer comprises PVC, PP, PE, a soft inlay layer comprising polyester or a combination of these materials. Furthermore, for the foam layer a foam based on polyurethane (PU) can be used. For example, the decorative layer can be a compound of textile materials, a foam and a fleece material.

Moreover, a woven textile material, a foamed synthetic leather, a plastic film or foil or a leather can be used as the decorative layer. These materials can form a single layer of the decorative layer, or can form a cover layer of a multilayer decorative layer. With the use of a textile scrim as a decorative layer, the textile scrim or a film or foil or a combination of both can be used as the starting material.

The cover layer can, in particular, comprise a thickness of 0.3 mm to 0.7 mm, and the foam layer can comprise a thickness of 0.7 mm to 2.5 mm.

The laminating tool 1 comprises, in particular: a first tool component 2 comprising a supporting surface 8 for placing the substrate component 10; a holding device 17 for holding the decorative layer 16 that for inserting the decorative layer in a tensioned manner is moveable from a region outside the laminating tool 1 to a holding position in which a decorative layer 16 accommodated by the aforesaid is held above the first tool component 2; an upper tool frame 13 that is positioned above the first tool component 2; and a lower tool frame 6, which from a first position in which the aforesaid is situated underneath the holding position of the holding device 17 is positioned in a second position in which the aforesaid is situated on the upper tool frame 13 in order to, in this position, together with the upper tool frame 13 hold the decorative layer 16 at an edge region.

Furthermore, the device comprises a moulding contour piece 15, which can be moved by means of an adjustment device, with a moulding contact surface 15a, wherein the adjustment device is designed in such a manner that in a first position the moulding contact surface 15a of the moulding contour piece 15 is situated above the holding device in its holding position, and in a second position the moulding contact surface 15a of the moulding contour piece 15 is situated below the holding device in its holding position, wherein in its second position the contour piece 15 can press the decorative layer 16 against a region of the substrate component 10 resting against the supporting surface 8.

The tool frames or tensioning frames can be movable relative to each other. Furthermore, it can be provided for the upper tensioning frame 13 to be affixed to an upper tool component and to be immovable. In particular, in this arrangement it can be provided for the lower tensioning frame 6 to be able to be brought from a position in which said tensioning frame 6 is positioned on the first tool component 2, and in particular below the supporting surface of said first tool component 2, to a position in which said lower tensioning frame 6 with its holding section for holding the decorative layer (FIG. 3) is situated on the upper tensioning frame.

FIG. 1 shows a section view of a laminating tool 1 comprising a first tool component or upper tool 2 and a second tool component or lower tool 3. The laminating tool 1 can, in particular, be installed in a press, although the method according to the invention according to one exemplary embodiment is not implemented as a compression-moulding method. The first tool component 1 is installed on a base plate 4. The second tool component 3 can, in particular, be designed as a housing component. According to one exemplary embodiment, a negative-pressure generating device or a vacuum pump is connected to the housing component 3, and a corresponding air passage, for example comprising several apertures, is installed so that the space 18, which is delimited by the second tool component 3, can be subjected to negative pressure In the above embodiment of the laminating tool 1 with an additional compression-moulding functionality the second tool component 5 can be designed as an upper press plate 5.

In this context the terms "above" and "below" are defined by the direction S of the force of gravity.

The lower tool 3 comprises a lower tool frame 6 and a lower tool body 7 that comprises three straight sides and a fourth side with a tool contour 8. The lower frame 6 rests against the base plate 4 and is secured by positioning pins 9 against displacement or sliding on the base plate 4. FIG. 1 does not show that the lower tool frame 6 can be moved, relative to the lower tool body 7, in a linear manner perpendicularly away from the base plate 4. The tool body 7 can be firmly connected to the base plate 4, for example screwed together, or tensioned by a tensioning device (not shown).

On the tool body 7 there is a substrate layer 10 whose contour 11 matches the tool contour 8 so that the substrate layer 10 rests in a positive-locking manner against the tool body 7. The substrate layer 10 comprises a recess 12 or aperture.

The upper tool 3 comprises an upper tool frame 13 that is firmly connected to the upper press plate 5, for example by means of screws. Together with the upper press plate 5 the upper tool frame 13 forms a box which is open only at its underside 14, in other words at its side facing the lower tool 2. The upper tool 3 furthermore comprises two detection devices in the form of light barriers 22.

Associated with the upper tool 3 is a moulding contour piece 15 in an initial position in which it projects beyond the upper tool frame 13 downwards in the direction of the lower tool 2. As indicated by arrows, the moulding contour piece 15 can be moved perpendicularly in the direction towards the lower tool 2 and away from the lower tool 2. This movement can be effected by an adjustment device (not shown) that is driven by a drive device.

Between the lower tool 2 and the upper tool 3 a holding frame or tensioning frame 17 is shown, with a held or clamped decorative layer 16 that is to be laminated onto the substrate layer 10. The decorative layer 16 comprises a first side and a second side 21, wherein the first side 20 is the underside of the decorative layer 16, which is placed on the substrate component 10 and is connected to the aforesaid, while the second side 21 is the side of the decorative layer 16 which in the finished laminated component forms the visible side. The holding frame 17 is also connected to an adjustment device (not shown), which can retract and extend the holding frame 17 to the laminating position.

Figure 2:
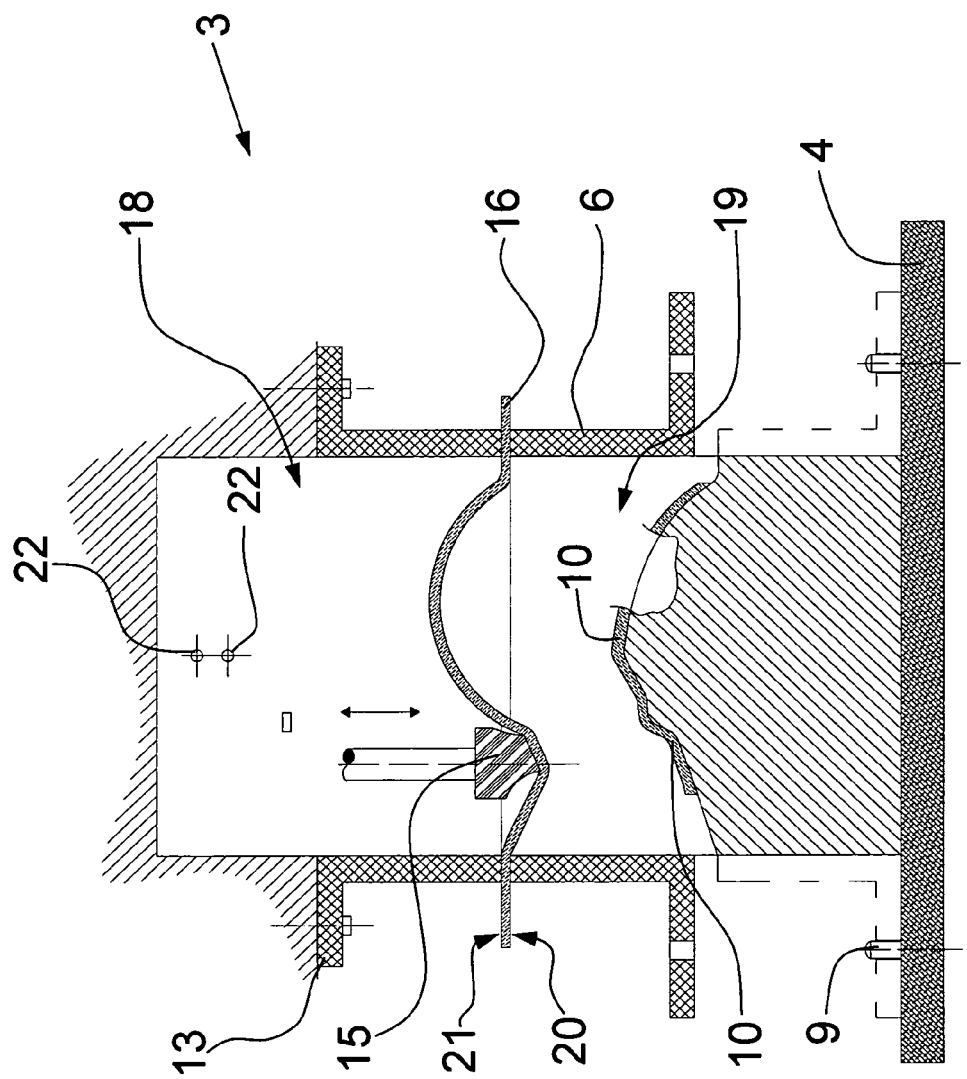
FIG. 2 illustrates the laminating tool during the closing procedure with decoration material that is pre-formed in one section by the moulding contour piece according to the invention.

FIG. 2 shows the next step of the laminating process. The lower tool frame 6 has been moved upwards in a linear manner from the home position on the base plate 4, which home position is shown in FIG. 1, by means of a driven adjustment device (not shown) so that the lower tool frame 6 and the upper tool frame 13 between each another hold the decorative layer 16 in a clamping manner. The holding frame 17 has released the decorative layer 16 and is no longer visible in FIG. 2.

During movement of the lower tool frame 6 to the upper tool frame 13 the lower tool frame 6 has taken along the decorative layer 16 held in the tensioning frame 17 into the clamping position. In this process the moulding contour piece 15 has pressed itself into the decorative layer 16 by the length of the projection, and has deformed said decorative layer 16 in one section.

The decorative layer 16 is curved away from the lower tool 2 in one direction. This curvature can be achieved in that from below or from one of the sides, by means of a blowing device, for example a fan, a volume of compressed air or compressed gas is blown into the body that comprises the two tool frames 6, 13 so that as a result of the pressure the decorative layer 16 curves upwards in the direction away from the lower tool body 7. The curvature can also be achieved in that in the space 19 between the decorative layer 16 and the upper tool 3 negative pressure is generated so that the decorative layer 16 curves in the direction of the lower pressure. This can, for example, be achieved in that the decorative layer 16 comprises a length and width that exceeds the length and width of the clamping connection between the tool frames 6, 13, and consequently the decorative layer 16 forms a first space 18 with the lower tool, and a second space 19, separated from the first space 18 by the decorative layer 16. In this arrangement the air exchange between the first space 18 and the second space 19 depends on the air permeability of the decorative layer 16.

In order to monitor the size of the bubble formed by the decorative layer 16, the upper tool comprises two sensor devices, for example two light barriers 22. The sensor devices are connected to a control device that can detect and utilise signals generated and received by the sensor device. By means of the two light barriers 22, it is possible, for example, to monitor whether the bubble formed from the decorative layer 16 by way of blowing or by negative pressure is too big or too small. If the bubble is too big, the decorative layer 16 may be tensioned excessively, which can have a negative impact on the quality of any grain arrangement on the second side 2 of the decorative layer 16, which results in the manufacture of inferior products or reject products. If the bubble is too small, any folds contained in the decorative layer 16 cannot be completely smoothed out, or insufficient pre-stretching of the decorative layer 16 makes it impossible to obtain a neat laminating result.

The size of the bubble in relation to the supplied quantity of air per unit of time can also help detect material faults in the decorative layer 16. For example, material thicknesses of the decorative layer 16, which thicknesses are outside the tolerance range, can result in the formation of bubbles that are too large or too small. Monitoring of bubble formation, which takes place ahead of the laminating process, can thus help reduce the production of inferior or unsatisfactory components.

The size of the bubble can also provide feedback relating to the temperature of the ecorative layer 16. Since the elasticity of the decorative layer 16 increases as the temperature increases, the formation of too large a bubble can indicate too high a temperature of the decorative layer; while the formation of too small a bubble can indicate too low a temperature.

In FIG. 3 the moved-together tool frames 6, 13 with the jammed-in decorative layer 16 are together moved in the direction of the lower tool body 7. The illustration depicts the moment at which the moulding contour piece 15 with the deformed decorative layer 16 runs against the lower tool body 7. In other words, up to this point in time the two moved-together tool frames 6, 13 together with the moulding contour piece 15 have been moved from the uppermost end position in a linear manner in the direction of the base plate 4. In this process the curvature of the decorative layer 16 is maintained.

FIG. 4 shows the laminating tool 1 in its closed state. The lower tool frame 6 is still connected to the upper tool frame 13; between the tool frames 6, 13 the decorative layer 16 is still held in a clamped manner. During the last closing movement, at the start of which the moulding contour piece 15 already rests on the substrate layer 10, the moulding contour piece 15 is pressed against the substrate layer 10 at a predetermined pressure.

By lowering the connected tool frames 6, 13 at the same time the decorative layer 16 is tensioned over the substrate layer 10. In this process the decorative layer 16, during the entire time in which it is tensioned over the substrate layer 10 right through to completion of the laminating process, is held in the section by the moulding contour piece 15 so that this section can no longer be displaced relative to the substrate layer 10 during the stretching of the decorative layer 16. By means of this holding of the decorative layer 16 in the section the degree of drawing out the decorative layer 16 is reduced at least in some parts of the substrate layer 10, as a result of which any structure or grain arrangement present on the second side 21 of the decorative layer 16 is extended to a lesser extent by the drawing-out forces than is the case in known methods. This in turn means that the structure or grain arrangement on the second side 21 of the decorative layer is better preserved in its original form.

In the laminating tool according to the invention the moulding contour piece 15 can thus be movable relative to the tool component 2; 3; 6; 13 and/or the holding device 17; 6, 13 in a linear manner. To this effect the moulding contour piece 15 can comprise an adjustment device that is coupled to said holding device 17; 6, 13, by means of which adjustment device the contour piece 15 can be moved in the direction towards the tool component 2; 3; 6, 13, and can be made to contact the second side of the decorative layer 16 in the state resting on the tool component 2; 3; 6; 13. Furthermore, the laminating tool can comprise an adjustment device that is coupled to the holding device 17; 6, 13, by means of which adjustment device the holding device 17; 6, 13 can be moved from a holding position in the direction towards the moulding contour piece and/or in the direction towards the tool component 2; 3; 6; 13. Furthermore, the laminating tool can comprise an adjustment device that is coupled to the tool component 2; 3; 6; 13, by means of which adjustment device the tool component 2; 3; 6; 13 can be moved in the direction towards the holding device 17 and/or towards the moulding contour piece.

According to one exemplary embodiment of the laminating tool, the adjustment device of the holding device 17 can be designed in such a manner
- that the holding device 17 can be moved from a first position, when viewed from the tool component, in the direction towards the moulding contour piece 15 to an intermediate position relative to the position of the contour piece 15, in which intermediate position the contour piece 15 projects to a predetermined extent beyond the cross-sectional profile of a decorative layer held by the holding device 17 in the direction towards the tool component 2; 3; 6; 13, and
- that when the intermediate position has been reached, the holding device 17 can be moved, up to a desired position relative to the tool component 2; 3; 6; 13, in the direction towards the tool component 2; 3; 6; 13.

In this arrangement the adjustment device of the holding device 17 can comprise a drive device for operating said holding device 17, and the laminating device can comprise a control device, which is functionally coupled to the adjustment device of the holding device 17, for moving the holding device up to a desired position relative to the tool component 2; 3; 6; 13.

In order to control or automate the laminating method according to the invention the laminating device can comprise a sensor device for acquiring the intermediate position of the holding device 17 and/or of the desired position relative to the tool component 2; 3; 6; 13. A display device can be functionally coupled to the sensor device, by means of which display device the reaching of the intermediate position of the holding device 17 can be indicated. This indication can, in particular, be used for manually implementing the laminating method according to the invention. In order to automate the laminating method according to the invention, the adjustment device of the holding device 17, the control device and the sensor device for acquiring the intermediate position can be equipped and functionally coupled in such a manner that when the holding device 17 has reached the intermediate position the control device receives a signal from the sensor device, and, based on this signal, the control device sends a command signal to the adjustment device of the holding device 17, based on which signal said adjustment device moves the holding device 17 up to a desired position relative to the tool component 2; 3; 6; 13.

Furthermore, the laminating tool can comprise an adjustment device for adjusting the position of the moulding contour piece 15, which adjustment device is designed in such a way that the adjustment device of the moulding contour piece 15 can move said contour piece 15 from a position in the direction towards the holding device 17 to an intermediate position in which the contour piece projects to a predetermined extent beyond the cross-sectional profile of the decorative layer in its state held by the holding device in the direction of the tool component 2; 3; 6; 13, and that when the intermediate position has been reached, the adjustment device of the moulding contour piece 15 can move said contour piece in the direction towards the tool component 2; 3; 6; 13 up to a desired position relative to the tool component 2; 3; 6; 13.

In this arrangement the adjustment device of the moulding contour piece 15 can comprise a drive device for operating said adjustment device. Furthermore, the laminating device can comprise a control device, which is functionally coupled to the adjustment device of the moulding contour piece 15, for moving the moulding contour piece 15 up to a desired position relative to the tool component 2; 3; 6; 13. In a further exemplary embodiment the laminating device can comprise a sensor device for acquiring the intermediate position of the moulding contour piece 15 and/or the desired position relative to the tool component 2; 3; 6; 13. A display device can be functionally coupled to the sensor device, by means of which display device reaching of the intermediate position of the moulding contour piece 15 can be indicated. In a further exemplary embodiment of the laminating device it can be provided for the adjustment device of the moulding contour piece 15, the control device and the sensor device for acquiring the intermediate position to be equipped and functionally coupled in such a manner that when the intermediate position of the moulding contour piece 15 has been reached the control device receives a signal from the sensor device, and on the basis of this signal the control device sends a command signal to the adjustment device of the moulding contour piece 15, on the basis of which signal said adjustment device moves the moulding contour piece 15 to a desired position relative to the tool component 2; 3; 6; 13.

As an alternative, or in addition, to the above-mentioned adjustment devices the adjustment device of the tool component 2; 3; 6; 13 can be designed in such a manner that the tool component 2; 3; 6; 13 can be moved in the direction towards the holding device 17 and/or of the moulding contour piece 15 up to a desired position relative to the holding device 17 and/or to the moulding contour piece 15. In this arrangement the adjustment device of the tool component 2; 3; 6; 13 can comprise a drive device for operating said adjustment device, and the laminating device can comprise a control device, which is functionally coupled to the adjustment device of the tool component 2; 3; 6; 13, for moving the tool component 2; 3; 6; 13 up to a desired position relative to the holding device 17 and/or to the moulding contour piece 15. In this arrangement, furthermore, the laminating device can comprise a sensor device for acquiring the desired position relative to the holding device 17 and/or to the moulding contour piece 15. In a further exemplary embodiment, as an alternative or in addition, it can be provided for a display device to be functionally coupled to the sensor device, by means of which display device reaching the desired position of the tool component 2; 3; 6; 13 relative to the holding device 17 and/or to the moulding contour piece 15 is indicated. In this arrangement, furthermore, the adjustment device of the tool component 2; 3; 6; 13, the control device and the sensor devices for acquiring an intermediate position can be equipped and functionally coupled in such a manner that when the intermediate position of the holding device 17 and/or of the moulding contour piece 15 has been reached the control device receives a signal from the sensor device, and on the basis of this signal the control device sends a command signal to the adjustment device of the tool component 2; 3; 6; 13, on the basis of which signal said adjustment device moves the tool component 2; 3; 6; 13 up to a desired position of the tool component 2; 3; 6; 13 relative to the holding device 17 and/or to the moulding contour piece 15.

By means of one of the above-mentioned exemplary embodiments of the laminating tool according to the invention, the method according to the invention for laminating a substrate layer with a thermally deformable decorative layer 16 can be implemented, in which method, for laminating, the decorative layer 16 is held taut and is placed onto a substrate layer 10 resting on the tool component 2; 3; 6; 13, wherein the decorative layer 16 comprises a first side 20 that faces the substrate layer 10, and a second side 21 that faces away from the substrate layer 10, wherein prior to placing the decorative layer 16 on the substrate layer 10 a moulding contour piece 15, which can be moved relative to the decorative layer 16, is made to contact the second side 21 of the pre-heated decorative layer 16, and as a result of a further movement of the moulding contour piece 15 relative to the holding device 17 deforms the decorative layer 16 in one section. In this arrangement it can be provided for the decorative layer 16, prior to and during laminating, to be held on the substrate layer 19 on a section by the moulding contour piece 15 in order to reduce the degree of drawing out the decorative layer 16 on the substrate layer 10.

Furthermore, the method according to the invention can comprise the steps of:

moving the moulding contour piece 15 in the direction towards the tool component 2; 3; 6; 13 to a position in which a section of the moulding contour piece 15 presses a section of the decorative layer 16 onto a section of the substrate layer 19, releasing, by means of the holding device, at least one region of the decorative layer 16, and placing the section that extends between the released region and the section held by the moulding contour piece 15 on the substrate component 19.

In this arrangement it can be provided for, prior to placement of the decorative layer 16 on the substrate component 10, the decorative layer 16 to be heated to a processing temperature. To this effect it can, in particular, be provided for the decorative layer 16, prior to its placement on the substrate layer 10, to be subjected to the blowing of hot compressed air in the tool, and for the decorative layer 16 consequently to be heated to a processing temperature, and/or for the processing temperature consequently to be held within a predetermined temperature range. In this arrangement, by means of compressed air in a manner of a partial bubble, a pressure force, directed from the direction of the tool onto the decorative layer 16, for forming a partially bubble-shaped deformation of the decorative layer 16 away from the tool component 2; 3; 6; 13 can be generated, wherein the compressed air is generated by a blowing device or by a suction device.

The method can comprise the steps of:

moving the holding device 17 from a first position, when viewed from the tool component, in the direction towards the moulding contour piece 15 to an intermediate position relative to the position of the contour piece 15, in which intermediate position the contour piece 15 projects to a predetermined extent beyond the cross-sectional profile of a decorative layer held by the holding device 17 in the direction towards the tool component 2; 3; 6; 13, and when the intermediate position has been reached, moving the holding device 17 up to a desired position relative to the tool component 2; 3; 6; 13 in the direction towards the tool component 2; 3; 6; 13.

As an alternative or in addition, the method can comprise the steps of:

moving the moulding contour piece 15 from a position in the direction towards the holding device 17 to an intermediate position, in which intermediate position the contour piece projects to a predetermined extent beyond the cross-sectional profile of the decorative layer in its state held by the holding device 17 in the direction towards the tool component 2; 3; 6; 13, and when the intermediate position has been reached, moving the moulding contour piece 15 in the direction towards the tool component 2; 3; 6; 13 up to a desired position relative to the tool component 2; 3; 6; 13.

As an alternative or in addition, the method can provide for moving the tool component 2; 3; 6; 13 up to a desired position relative to the holding device 17 and/or to the moulding contour piece 15.

LIST OF REFERENCE CHARACTERS

1 Laminating tool
2 Lower tool
3 Upper tool
4 Base plate
5 Upper press plate
6 Lower tool frame
7 Lower tool body
8 Tool contour, moulding contour surface
9 Positioning pins
10 Substrate layer
11 Contour
12 Recess
13 Upper tool frame
14 Underside
15 Moulding contour piece
16 Decorative layer
17 Holding device, tensioning frame
18 First space
19 Second space
20 First side
21 Second side
22 Light barrier

The invention claimed is:

1. A laminating tool for the manufacture of a component, comprising:

a lower tool component comprising a lower tool frame and a lower tool body, wherein the lower tool body is disposed within the lower tool frame, wherein the lower tool frame is configured to move relative to the lower tool body along a moving direction, and wherein the lower tool body comprises a supporting surface operating to receive and support a substrate component;

an upper tool component comprising an upper tool frame disposed as a fixed part of the upper tool component and facing the lower tool frame, wherein the upper tool frame and the lower tool frame are configured to move relative to one another;

a moulding contour piece comprising a moulding contact surface;

a holding device for holding a decorative layer between the lower tool frame and the upper tool frame;

a driven tool component-adjustment device that operates to move opposed first and second contact surfaces of the upper and lower tool frames, respectively, toward one another along the moving direction such that the decorative layer is clamped and held between the opposed first and second contact surfaces, with a first side of the decorative layer facing toward the supporting surface of the lower tool body and an opposite second side of the decorative layer facing away from the supporting surface toward the upper tool component; and a driven contour piece-adjustment device that operates to move the moulding contour piece along the moving direction relative to the lower tool body and the upper and lower tool frames, wherein, when the decorative layer is clamped between the opposed first and second contact surfaces of the upper and lower tool frames, the driven tool component-adjustment device and/or the driven contour piece-adjustment device operates to bring the moulding contact surface of the moulding contact piece into contact with the second side of the decorative layer such that a section of the decorative layer is deformed in the direction of the lower tool body by the moulding contour piece, wherein, when the decorative layer is clamped between the opposed first and second contact surfaces of the upper and lower tool frames, the driven contour piece-adjustment device operates to move the moulding contour piece between a first position, in which the moulding contact surface of the moulding contour piece and the decorative layer are spaced apart from and situated above the substrate component disposed on the supporting surface of the lower tool body, and a second position, in which the moulding contact surface of the moulding contour piece presses a section of the decorative layer against a corresponding section of the substrate component disposed on the supporting surface of the lower tool body, and wherein, when the decorative layer is clamped between the opposed first and second contact surfaces of the upper and lower tool frames and the moulding contour piece is located in the second position, the tool component-adjustment device operates to move the upper tool frame, the lower tool frame, and the decorative layer clamped therebetween toward the lower tool body such that a remaining section of the decorative layer engages a corresponding section of the substrate component disposed on the supporting surface of the lower tool body.

2. The laminating tool according to claim 1, wherein the holding device is configured to release the decorative layer after the opposed first and second contact surfaces of the upper and lower tool frames clamp the decorative layer.

3. A laminating device according to claim 2, wherein:
a holding device-adjustment device comprises a drive device for operating the holding device-adjustment device, and
the laminating device comprises a control device, which is functionally coupled to the holding device-adjustment device, for moving the holding device up to a desired position relative to the lower tool body and the lower tool frame.

4. The laminating device according to claim 3, further comprising a sensor device for acquiring a position of the holding device relative to the lower tool body and the lower tool frame.

5. The laminating device according to claim 4, wherein the holding device-adjustment device, the control device and the sensor device are equipped and functionally coupled in such a manner that, when the holding device has reached a holding position, the control device receives a signal from the sensor device, and, based on this signal, the control device sends a command signal to the holding device-adjustment device, based on which signal the holding device-adjustment device moves the holding device up to a desired position relative to the tool component.

6. The laminating device according to claim 1, wherein:
the contour piece-adjustment device comprises a drive device, and
the laminating device comprises a control device functionally coupled to the control piece-adjustment device that operates to move the moulding contour piece to a desired position relative to the lower tool body.

7. The laminating device according to claim 6, wherein the contour piece-adjustment device, the control device and a sensor device for acquiring a position of the moulding contour piece are equipped and functionally coupled in such a manner that, when the moulding contour piece has reached a first position, the control device receives a signal from the sensor device, and on the basis of this signal the control device sends a command signal to the contour piece-adjustment device, on the basis of which signal the contour piece-adjustment device moves the moulding contour piece to a second position relative to the lower tool body.

8. The laminating tool according to claim 1, wherein the moulding contour piece comprises a supporting surface which at least in some sections is formed so as to be complementary to a section of the supporting surface of the lower tool body.

9. The laminating tool according to claim 1, further comprising at least one of:
a blowing device that generates a pressure force against the first side of the decorative layer such that the decorative layer curves upward in a direction away from the lower tool component to form a partially bubble-shaped deformation of the decorative layer; and
a suction device that generates a suction force from the direction of the tool onto negative pressure environment above the decorative layer such that the decorative layer curves upward in a direction away from the lower tool component to form a partially bubble-shaped deformation of the decorative layer.

10. The laminating tool according to claim 9, further comprising at least one detection device for monitoring the extent of deformation of the decorative layer.

11. The laminating tool according to claim 10, wherein the detection device is configured to detect the size of the partially bubble-shaped deformation of the decorative layer.

12. The laminating tool according to claim 9, further comprising two detection devices, wherein a first detection device detects a maximally-permissible size of the partially bubble-shaped deformation of the decorative layer, and a second detection device detects a minimally-permissible size of the partially bubble-shaped deformation of the decorative layer.

13. The laminating tool according to claim 10, wherein the at least one detection device comprises a light barrier.

14. The laminating tool according to claim 10, wherein the detection device is functionally coupled to a control device that sends a command signal for moving the holding device, the moulding contour piece or the upper and lower tool frames when the control device has received a signal for a permissible size of the partially bubble-shaped deformation of the decorative layer.

15. A laminating tool for manufacturing a component from a substrate component and a decorative layer, the laminating tool comprising:
a lower tool component comprising a lower tool frame and a lower tool body disposed within the lower tool frame, wherein the lower tool body is stationary and the lower tool frame operates to move relative to the lower tool body in a first direction away from the lower tool body and in an opposite second direction toward the lower tool body, and wherein the lower tool body comprises a contoured supporting surface configured to receive and support the substrate component;
an upper tool component comprising an upper tool frame and having spaced side walls and an upper wall that together at least partially define an inner cavity, wherein the upper tool component has an opening at an underside thereof that faces toward the lower tool component, and wherein the opening in the underside of the upper tool component is at least partially defined by the upper tool frame;
a moulding contour piece comprising a moulding contact surface and being at least partially disposed within the inner cavity defined by the upper tool component, wherein the moulding contact surface faces toward the contoured supporting surface of the lower tool body, and wherein the moulding contour piece is configured to move relative to the lower tool body and the upper and lower tool frames in the first and second directions; and
a holding device that positions the decorative layer below the moulding contour piece, between the lower tool component and the upper tool component, and between the lower tool frame and the upper tool frame such that the decorative layer is spaced apart from the upper and lower tool components, with a first side of the decorative layer facing toward the lower tool body and a second opposite side of the decorative layer facing away from the lower tool body, wherein:

the upper tool frame and the lower tool frame are configured to move relative to each other in the first and second directions, the upper tool frame and the lower tool frame have opposed first and second contact surfaces, respectively, with the first contact surface being located on the underside of the upper tool component, and the opposed first and second contact surfaces of the upper and lower tool frames are configured to be brought together such that a peripheral section of the decorative layer is held therebetween in a clamping manner, while a central section of the decorative layer extends freely above the contoured supporting surface of the lower tool body.

16. The laminating tool according to claim 15, wherein the lower tool frame extends along an outer periphery of the lower tool body.

17. The laminating tool according to claim 15, wherein, when the decorative layer is held between the opposed first and second contact surfaces of the upper and lower tool frames, the upper tool component and the lower tool component together define a cavity having an upper space and a lower space that are separated from each other by the decorative layer.

18. The laminating tool according to claim 17 comprising a means for establishing a pressure differential across the cavity such that, after the decorative layer has been heated to a temperature sufficient to achieve a desired elasticity for laminating, the decorative layer curves upward in a direction away from the lower tool component.

19. The laminating tool according to claim 17, wherein the moulding contour piece is configured to move in the second direction toward the lower tool body from a first position located at least partially within the upper space to a second position in which the moulding contact surface of the moulding contour piece presses a section of the decorative layer against a corresponding section of the substrate component disposed on the supporting surface of the lower tool body.

20. The laminating tool according to claim 15, wherein, when the decorative layer is clamped between the opposed first and second contact surfaces of the upper and lower tool frames, a driven adjustment device operates to move the moulding contour piece or the upper and lower tool frames such that the moulding contact surface of the moulding contour piece comes into contact with the second side of the decorative layer and deforms a section of the decorative layer.

21. A laminating tool for manufacturing a component from a substrate component and a decorative layer, the laminating tool comprising:

a lower tool component comprising a lower tool frame and a lower tool body disposed within the lower tool frame, wherein the lower tool body is stationary and the lower tool frame operates to move relative to the lower tool body in a first direction away from the lower tool body and in an opposite second direction, and wherein the lower tool body comprises a contoured supporting surface configured to receive and support the substrate component;

an upper tool component comprising an upper tool frame; and a moulding contour piece comprising a moulding contact surface, wherein the moulding contact surface faces toward the contoured supporting surface of the lower tool body, and wherein the moulding contour piece is configured to move relative to the lower tool body and relative to the upper tool frame in the first and second directions, wherein:

the lower tool frame is configured to move relative to the upper tool frame in the first and second directions, the upper tool frame and the lower tool frame have opposed first and second contact surfaces, respectively, and the opposed first and second contact surfaces of the upper and lower tool frames are configured to be brought together such that a peripheral section of the decorative layer is held therebetween in a clamping manner, while a central section of the decorative layer extends freely above the contoured supporting surface of the lower tool body.

22. The laminating tool according to claim 21, wherein, when the peripheral section of the decorative layer is held between the opposed first and second contact surfaces of the upper and lower tool frames in a clamping manner, the decorative layer is positioned below the moulding contour piece, a first side of the decorative layer faces toward the lower tool body, and an opposite second side of the decorative layer faces away from the lower tool body.

23. The laminating tool according to claim 21, wherein the upper tool component has spaced side walls and an upper wall that together at least partially define an inner cavity, wherein the upper tool component has an opening at an underside thereof that faces toward the lower tool component, and wherein the opening in the underside of the upper tool component is at least partially defined by the upper tool frame.

24. The laminating tool according to claim 21, wherein the lower tool frame extends along an outer periphery of the lower tool body.

25. The laminating tool according to claim 21, wherein, when the peripheral section of the decorative layer is held between the opposed first and second contact surfaces of the upper and lower tool frames, the upper tool component and the lower tool component together define a cavity having an upper space and a lower space that are separated from each other by the decorative layer.

26. The laminating tool according to claim 25 comprising a means for establishing a pressure differential across the cavity such that, after the decorative layer has been heated to a temperature sufficient to achieve a desired elasticity for laminating, the decorative layer curves upward in a direction away from the lower tool component.

27. The laminating tool according to claim 25, wherein the moulding contour piece is configured to move in the second direction toward the lower tool body from a first position located at least partially within the upper space to a second position in which the moulding contact surface of the moulding contour piece presses a section of the decorative layer against a corresponding section of the substrate component disposed on the supporting surface of the lower tool body.

28. The laminating tool according to claim 21, wherein, when the peripheral section of the decorative layer is clamped between the opposed first and second contact surfaces of the upper and lower tool frames, a driven adjustment device operates to move the moulding contour piece or the upper and lower tool frames such that the moulding contact surface of the moulding contour piece comes into contact with the second side of the decorative layer and deforms a section of the decorative layer.

* * * * *